United States Patent
Neaton

(10) Patent No.: US 7,494,301 B1
(45) Date of Patent: Feb. 24, 2009

(54) EROSION CONTROL BLANKET DISPENSING APPARATUS

(76) Inventor: Daniel J. Neaton, 2165 Sally Ave., Watertown, MN (US) 55388

( * ) Notice: Subject to any disclaimer, the term of this patent is extended or adjusted under 35 U.S.C. 154(b) by 138 days.

(21) Appl. No.: 11/588,506

(22) Filed: Oct. 27, 2006

(51) Int. Cl.
*E02D 17/20* (2006.01)

(52) U.S. Cl. .................................. 405/302.6; 405/302.7

(58) Field of Classification Search ............. 405/302.6, 405/302.7, 129.9, 129.95, 15–17
See application file for complete search history.

(56) References Cited

U.S. PATENT DOCUMENTS

| | | | |
|---|---|---|---|
| 2,845,884 A | 8/1958 | Clausing et al. | |
| 4,353,946 A * | 10/1982 | Bowers | 428/109 |
| 4,909,667 A | 3/1990 | DeMello | |
| 5,039,250 A * | 8/1991 | Janz | 405/15 |
| 5,304,014 A * | 4/1994 | Slutz | 405/129.9 |
| 5,525,012 A | 6/1996 | Casimaty et al. | |
| 5,620,281 A * | 4/1997 | Lammers et al. | 405/129.9 |
| 5,906,167 A | 5/1999 | Miyachi | |
| 6,398,459 B1 * | 6/2002 | Vreeland | 405/302.6 |
| 6,551,031 B2 * | 4/2003 | Van Ornum | 405/302.7 |
| 6,592,295 B2 | 7/2003 | McPhillips | |
| 6,663,324 B2 | 12/2003 | Nordloh | |
| 6,945,739 B1 * | 9/2005 | Putman | 405/302.7 |
| 7,018,135 B2 * | 3/2006 | Kaul et al. | 405/129.75 |
| 7,044,689 B1 * | 5/2006 | McCormick | 405/302.6 |
| 7,056,069 B1 * | 6/2006 | Warnke | 405/302.7 |
| 7,144,202 B2 * | 12/2006 | McCormick | 405/302.6 |
| 2001/0048853 A1 * | 12/2001 | Kozak | 405/129.9 |
| 2002/0034422 A1 * | 3/2002 | Kazak | 405/129.9 |

* cited by examiner

*Primary Examiner*—Frederick L Lagman
(74) *Attorney, Agent, or Firm*—Daniel P. Dooley; Fellers, Snider, et al.

(57) ABSTRACT

An erosion control blanket dispensing method and apparatus is disclosed. The apparatus preferably includes, a rotary drive secured to a mounting plate, and a blanket spindle secured to the rotary drive. In a preferred embodiment, the rotary drive controls an angular position of the blanket spindle relative to the mounting plate. The erosion control dispensing apparatus further preferably includes, a spindle support structure disposed between the rotary drive and the blanket spindle, and an adjustable stop disposed between the spindle support structure and the blanket spindle, wherein the adjustable stop controls an angular position of the blanket spindle relative to the spindle support structure. A method of assembling the apparatus preferably includes at least the steps of providing a mounting plate, attaching a hydraulic rotary actuator to the mounting plate, securing a spindle support structure to the hydraulic rotary actuator, and affixing a blanket spindle to the spindle support structure.

18 Claims, 11 Drawing Sheets

EROSION CONTROL BLANKET DISPENSING APPARATUS

FIELD OF THE INVENTION

The present invention relates generally to the field of erosion control equipment and more particularly, but without limitation, to an erosion control blanket dispensing apparatus configured to support and dispense erosion control blankets.

BACKGROUND

The banks of dunes, cliffs, sloping grounds, and other properties are subject to highly undesirable erosion. Due to the cycling of temperature, moisture, freezing and other conditions, the surface layers thereof typically are unstable and tend to creep downwardly in shear. Sooner or later their facings give rise to serious dislocations unless steps are taken to secure the unstable surface layers against erosion.

In order to prevent erosion and for both aesthetic and environmental protection reasons, it is often necessary or desirable to grow ground vegetation because the roots of vegetation planted along such properties tend to secure the unstable surface layers against erosion. The successful sprouting and growth of ground vegetation planted on these areas, however, is often prevented by the soil erosion which the planted vegetation is designed to inhibit, the erosion frequently carrying away at least some portion of the soil before the vegetation takes hold. Furthermore, adverse weather may inhibit the vegetation growing process. For example, in a storm, the banks of such properties are subjected to powerful winds and rain that often carry away the facing soil, and with it, any vegetation rooted therein.

To alleviate this problem of eroding vegetation roots, it is now a common practice to lay erosion control blankets over grass seed. The protective covering most used is what is best termed a blanket or mat comprised of netting and underlying excelsior. At the job site, the erosion control blanket bundles are unrolled in a side-to-side relationship along the earth area to be protected against erosion, and are secured along the sides of one another and to the underlying ground area with the use of a spaced series of conventional ground staple members, which may be made of steel, wood, plastic or starch. The installed erosion control blankets generally have parallel sides and abut one another to form a substantially solid surface to shield the underlying earth area, and thus the planted ground vegetation therein, from wind and rain erosion forces. The erosion control blanket must be fastened in place in the ground so that it will not be displaced from the desired location by weather effects such as rain, water runoff or wind.

In order to install erosion control blankets, a user must roll the blankets over the ground. This type of installation requires the user to exert physical force in a bent over position which leads to back, neck and knee problems. After the erosion control blankets are installed, the blankets must then be fastened to the ground. Manually rolling out and securing the erosion control blankets onto the ground and fastening these blankets to the ground with devices that require manual operation is slow and inefficient.

Therefore, what is needed is a device that enables a user to efficiently install erosion control blankets while using minimal manual labor. It is to these and other improvements that preferred embodiments of the present invention are generally directed.

SUMMARY OF THE INVENTION

In accordance with a preferred embodiment, an erosion control blanket dispensing apparatus ("apparatus") that includes at least a mounting plate, a rotary drive secured to the mounting plate, and a blanket spindle communicating with and responsive to the rotary drive, wherein the rotary drive controls an angular position of the blanket spindle relative to the mounting plate is provided. The apparatus preferably further includes at least a spindle support structure disposed between and communicating with the rotary drive and the blanket spindle, an adjustable stop disposed between the spindle support structure and the blanket spindle, wherein the adjustable stop controls an angular position of the blanket spindle relative to the spindle support structure, a rotary hub assembly disposed between the blanket spindle and the spindle support structure, in which the adjustable stop is secured to the rotary hub assembly, and a collet disposed between the rotary hub assembly and the blanket spindle. Preferably, the collet is attached to the rotary hub assembly, and the blanket spindle is removably attached to the collet.

In a preferred embodiment, the apparatus also includes at least a stop plate communicating with and removably secured to the blanket spindle by a self-locking pin, the self-locking pin maintains the stop plate in abutting adjacency with an erosion control blanket, and the stop plate mitigating lateral movement of an erosion control blanket loaded in the blanket spindle.

Preferably, the first and second arms each provide an interlocking hinge portion interacting with one another for rotation of each arm relative to the other, when a hinge pin interacting with the interlocking hinge portions joins the arms together such that each arm rotates about said hinge pin. Preferably, the spindle support structure includes at least a securement flange provided at a proximal end of the main body portion and attached to the rotary drive, and a bushing assembly attached to a distal end of the main body portion and interacting with the rotary hub assembly to promote angular rotation of the blanket spindle relative to the main body portion.

In a preferred embodiment, the rotary hub assembly includes at least a mounting plate secured to the bushing assembly, a casing secured to the mounting plate, a bearing mounted within the casing, a rotatable shaft communicating with the bearing, the rotatable shaft free to rotate relative to the casing, an attachment flange secured to the rotatable shaft, wherein the attachment flange is secured to the collet to promote rotation of the blanket spindle relative to the casing, and the rotary drive is hydraulic rotary actuator.

In an alternate preferred embodiment, the erosion control blanket dispensing apparatus is assembled by steps that include at least providing a mounting plate, attaching a hydraulic rotary actuator to the mounting plate, securing a spindle support structure to the hydraulic rotary actuator, and affixing a blanket spindle to the spindle support structure. Additionally, the alternate preferred embodiment further preferably includes at least the steps of, mounting a rotary hub assembly to the spindle support structure, fastening a blanket collet to the rotary hub assembly, providing a mounting aperture in the mounting plate and a corresponding securement aperture in an attachment plate of the hydraulic rotary actuator, aligning the mounting aperture with the securement aperture, and securing the attachment plate to the mounting plate.

These and various other features and advantages which characterize the claimed invention will be apparent from reading the following detailed description and a review of the associated drawings.

DESCRIPTION OF THE PREFERRED EMBODIMENTS

Before explaining the present invention in detail, it is important to understand that the invention is not limited in its application to the details of the construction illustrated, or by the steps of construction inherently present by way of illustration of the appended drawings. The invention is capable of other embodiments and of being practiced or carried out in a variety of ways. It is to be understood that the phraseology and terminology employed herein is for the purpose of description to enhance an understanding by those skilled in the art, and does not impose limitation on the present invention.

Additional information concerning the presently preferred embodiments of the present invention can be found in the attached sheets of drawings and accompanying text thereon.

Figure 1:
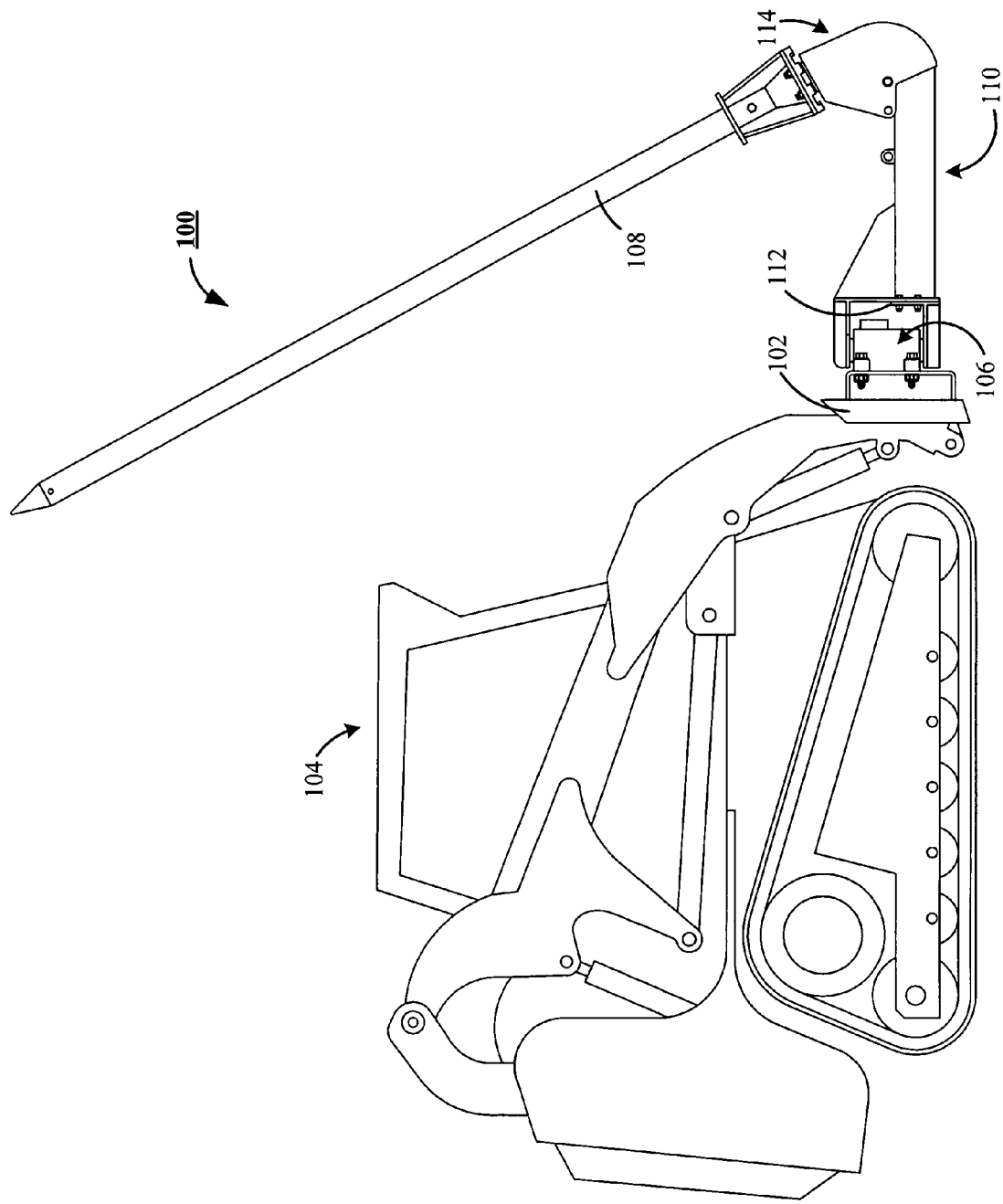
FIG. 1 shows a side elevation view of an inventive erosion control blanket dispensing apparatus.

Referring now to the drawings, and in particular to an example of a preferred embodiment of the present inventive erosion control blanket dispensing apparatus 100, also referred to herein as apparatus 100, as shown in FIG. 1. In a preferred embodiment, the apparatus 100 includes a mounting plate 102 that is coupled to a transport vehicle 104, such as a T190 compact track loader by the Bobcat Company of West Fargo, N. Dak. USA, which has been found useful in utilizing the apparatus 100. However, those skilled in the art will recognize that the present inventive erosion control blanket dispensing apparatus 100, may be attached to vehicles other than the T190 such as tractors, four wheel drive vehicles, or other suitable vehicles. It is further noted, that the selection of the T190 as a suitable vehicle for use with the apparatus 100 has been made to enhance an understanding of the invention by those skilled in the art, and does not impart to the present invention, or impose upon the present invention any limitations.

Preferably, the apparatus 100 further includes a rotary drive 106 secured to the mounting plate 102, and a blanket spindle 108 communicating with and responsive to the rotary drive 106. The rotary drive 106 controls an angular position of the blanket spindle 108 relative to the mounting plate 102.

FIG. 1, further shows a spindle support structure 110 disposed between and communicating with the rotary drive 106 and the blanket spindle 108; and a drive mount 112 attached to the rotary drive 106 and supporting the spindle support structure 110. In a preferred assembly process of the apparatus 100, the drive mount 112 is secured to a first end of the rotary drive 106, the spindle support structure 110 is lowered onto a second end of the rotary drive 106 and lightly fastened to the rotary drive 106, the spindle support structure 110 is aligned with, and securely fastened to the drive mount 112, then the spindle support structure 110 is securely fastened to the rotary drive 106.

Preferably, the apparatus 100 further includes a rotary hub assembly 114 disposed between the blanket spindle 108 in the spindle support structure 110. The rotary hub assembly 114 accommodates rotation of the blanket spindle 108 when installing an erosion blanket adjacent the earth.

Figure 2:
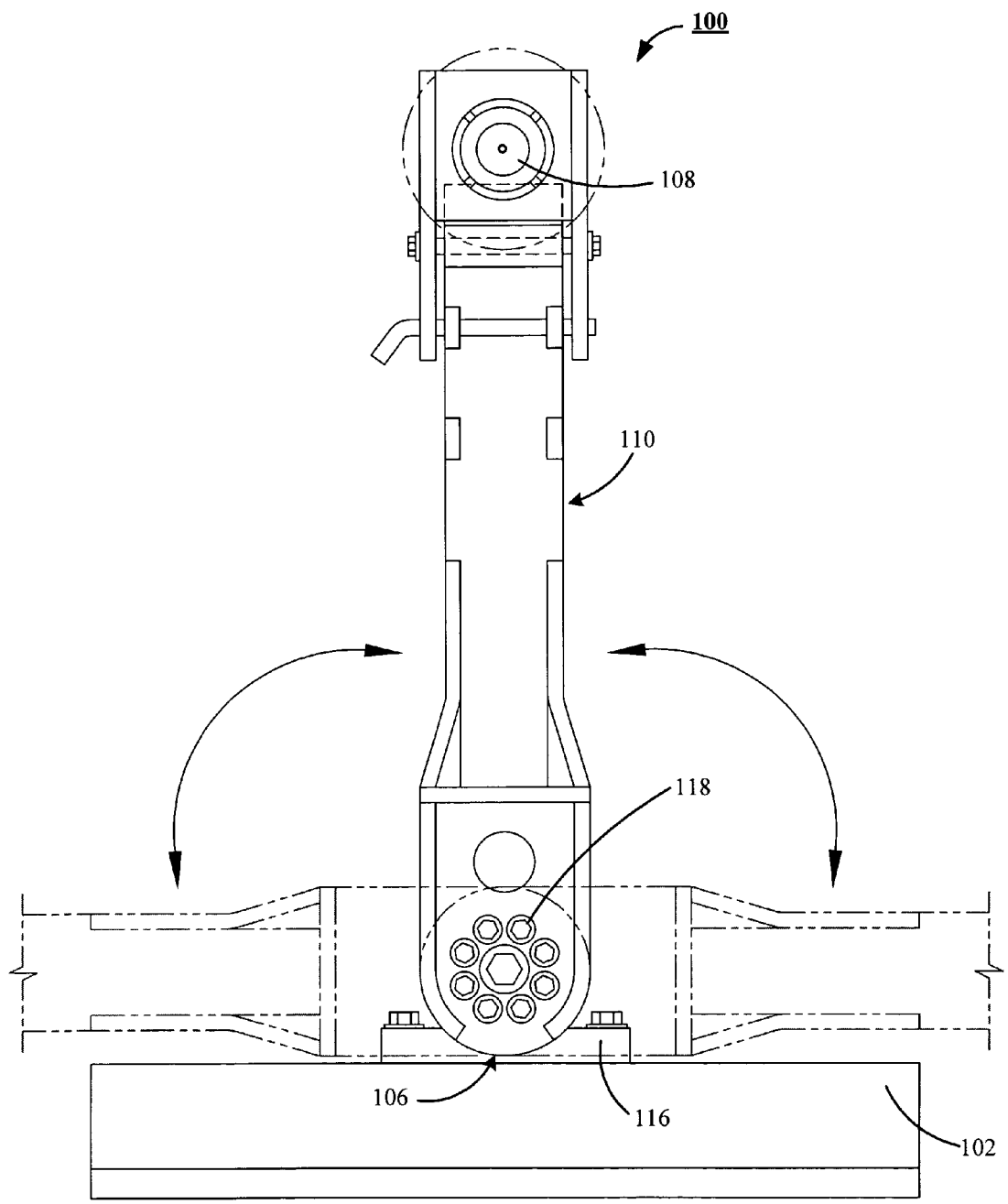
FIG. 2 shows a top plan view of the inventive erosion control blanket dispensing apparatus of FIG. 1.

FIG. 2 shows the rotary drive 106 includes an attachment plate 116 for securement of the rotary drive 106 to the mounting plate 102, and a plurality of fasteners 118 to secure the spindle support structure 110 to the rotary drive 106. The use of a hydraulic rotary actuator, such as a L20 series rotary actuator (with a 180° span of rotation) by Helac Corporation of Enumclaw Wash. USA, as the rotary drive 106 has been found useful as a preferred best mode of enabling the apparatus 100. However, those skilled in the art will recognize that an electric motor, such as a DC stepper motor, or a pneumatic motor could easily accommodate and fulfill the functional requirements of the rotary drive 106.

The use of the rotary drive 106 allows an operator of the transport vehicle 104 (of FIG. 1) to radially position the blanket spindle 108 anywhere along a 180° ark. That is, from being parallel to the mounting plate 102 and extending out to the left of the transport vehicle 104, to being parallel to the mounting plate 102 and extending out to the right of the transport vehicle 104, and to do so without having to leave the cab of the transport vehicle 104.

Figure 3:
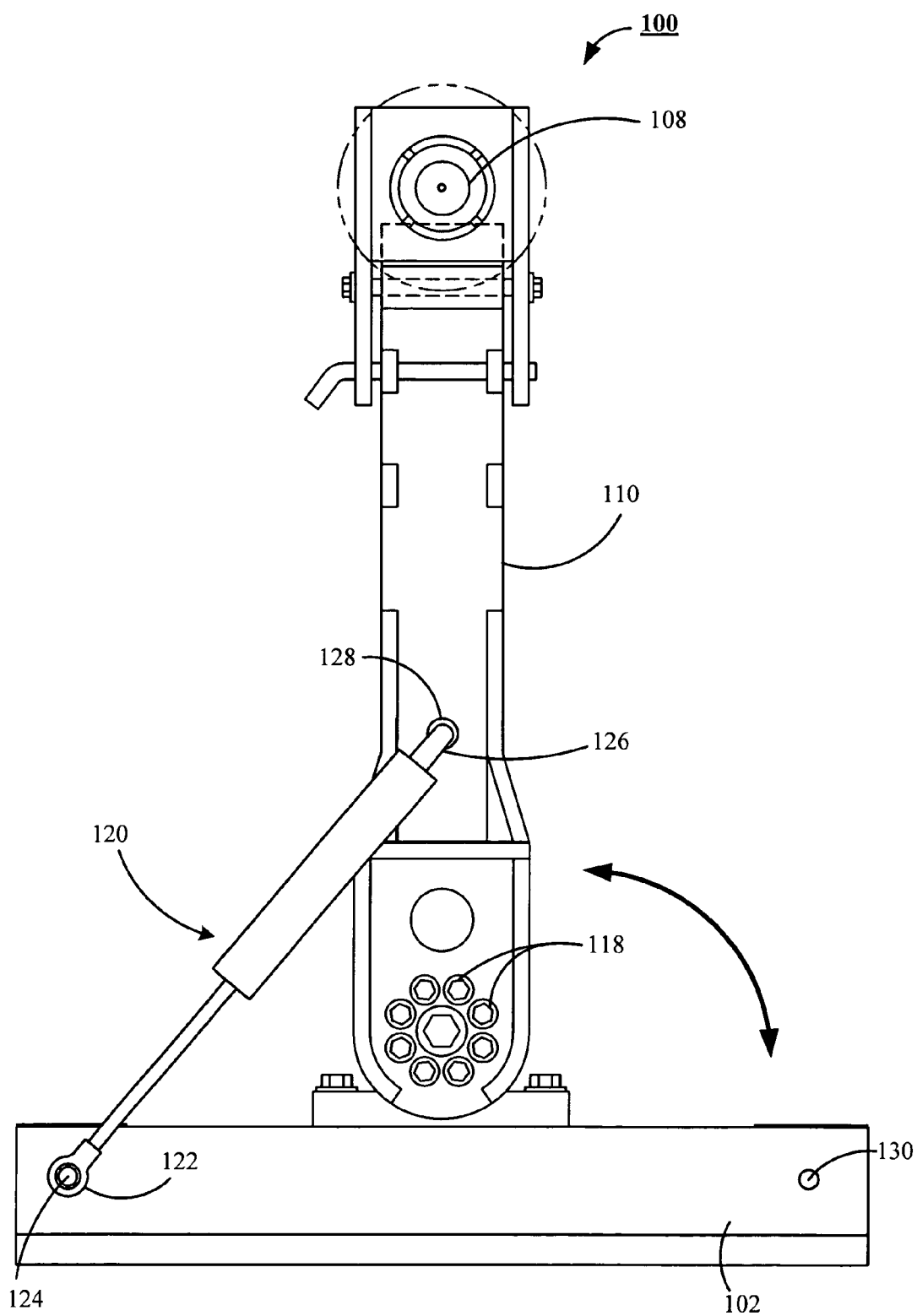
FIG. 3 shows a top plan view of an alternate preferred embodiment of the inventive erosion control blanket dispensing apparatus of FIG. 1.

FIG. 3 shows an alternative embodiment that employs a hydraulic cylinder 120, to control the angular position of the blanket spindle 108 relative to the mounting plate 102. Preferably, the hydraulic cylinder 120 is secured at a first end 122 to the mounting plate 102 via a first cylinder mount 124 (which in a preferred embodiment is a first shaft 124), and secured at a second end 126 to the spindle support structure 110 via a cylinder bushing 128.

In the preferred alternative embodiment, the hydraulic cylinder 120 allows an operator of the transport vehicle 104 (of FIG. 1) to radially position the blanket spindle 108 anywhere along a 90° ark. That is, from being perpendicular to the mounting plate 102 and extending out directly in front of the transport vehicle 104, to a position of being parallel to the mounting plate 102 and extending out to the left of the transport vehicle 104.

Alternatively, by manually repositioning and securing the first end 122 of the hydraulic cylinder 120 to the mounting plate 102 via a second cylinder mount 130 (which in a preferred embodiment is a second shaft 130), the operator is able to position the blanket spindle 108 anywhere along a 90° ark extending in the opposite direction. That is, from a position of being perpendicular to the mounting plate 102 and extending out directly in front of the transport vehicle 104, to a position of being parallel to the mounting plate 102 and extending out to the right of the transport vehicle 104. In a preferred alternative embodiment, once the operator has selected which cylinder mount 124, 130 the hydraulic cylinder 120 is to be attached to, the operator can control the radial angular position of the blanket spindle 108 anywhere along the 90° ark from within the cab of the transport vehicle 104.

Figure 4:
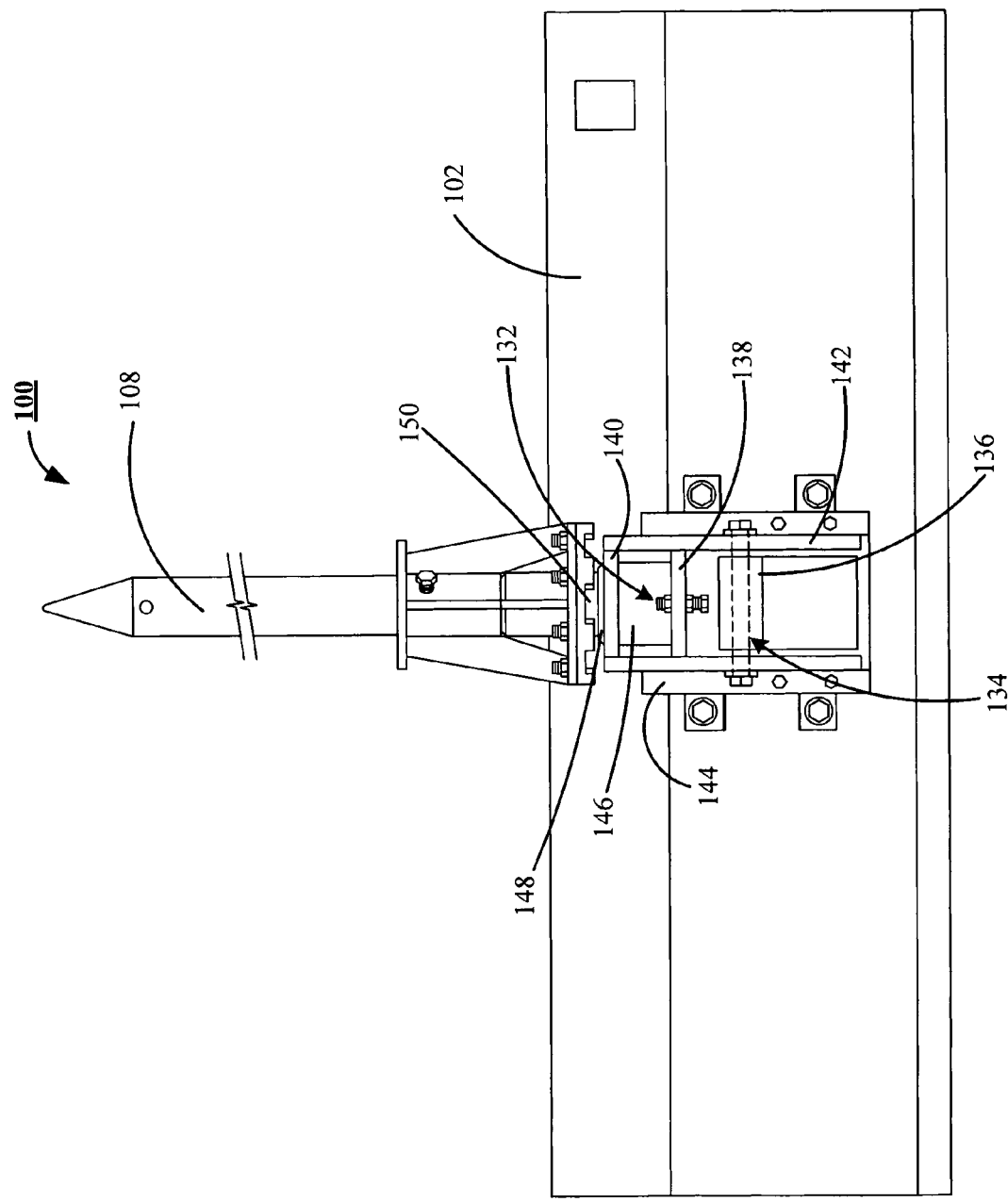
FIG. 4 shows a front elevation view of the inventive erosion control blanket dispensing apparatus of FIG. 1 configured for transport of the apparatus.

FIG. 4 shows the apparatus 100 includes an adjustable stop 132 disposed between the blanket spindle 108 in the spindle support structure 110. The adjustable stop 132 controls the angular position of the blanket spindle 108 relative to the spindle support structure 110 via the adjustable stop 132 promotes the ability to adjust the blanket spindle 108 between the position parallel to the ground to a position substantially inclined at a 20° angle to the ground.

FIG. 4 further shows the rotary hub assembly 114 is secured to the spindle support structure 110 by a rotary hub axle 134 (showed in dashed lines), which interacts with a rotary hub bushing 136 to promote vertical rotation of the rotary hub assembly 114 relative to the spindle support structure 110. Preferably, the rotary hub bushing 136 is presented with a square external configuration to promote ease of welding the rotary hub bushing 136 to the spindle support structure 110.

In a preferred embodiment, the adjustable stop 132 is secured to a first horizontal support brace 138, which together with a second horizontal support brace 140, establish a predetermined distance between the first side wall 142 of the rotary hub assembly 114, and the second side wall 144 of the rotary hub assembly 114. Additionally shown by FIG. 4, the first horizontal support brace 138 supports a casing 146, the casing 146 houses a bearing 148, which interacts with a rotatable shaft 150, which is free to rotate relative to the casing 146.

Figure 5:
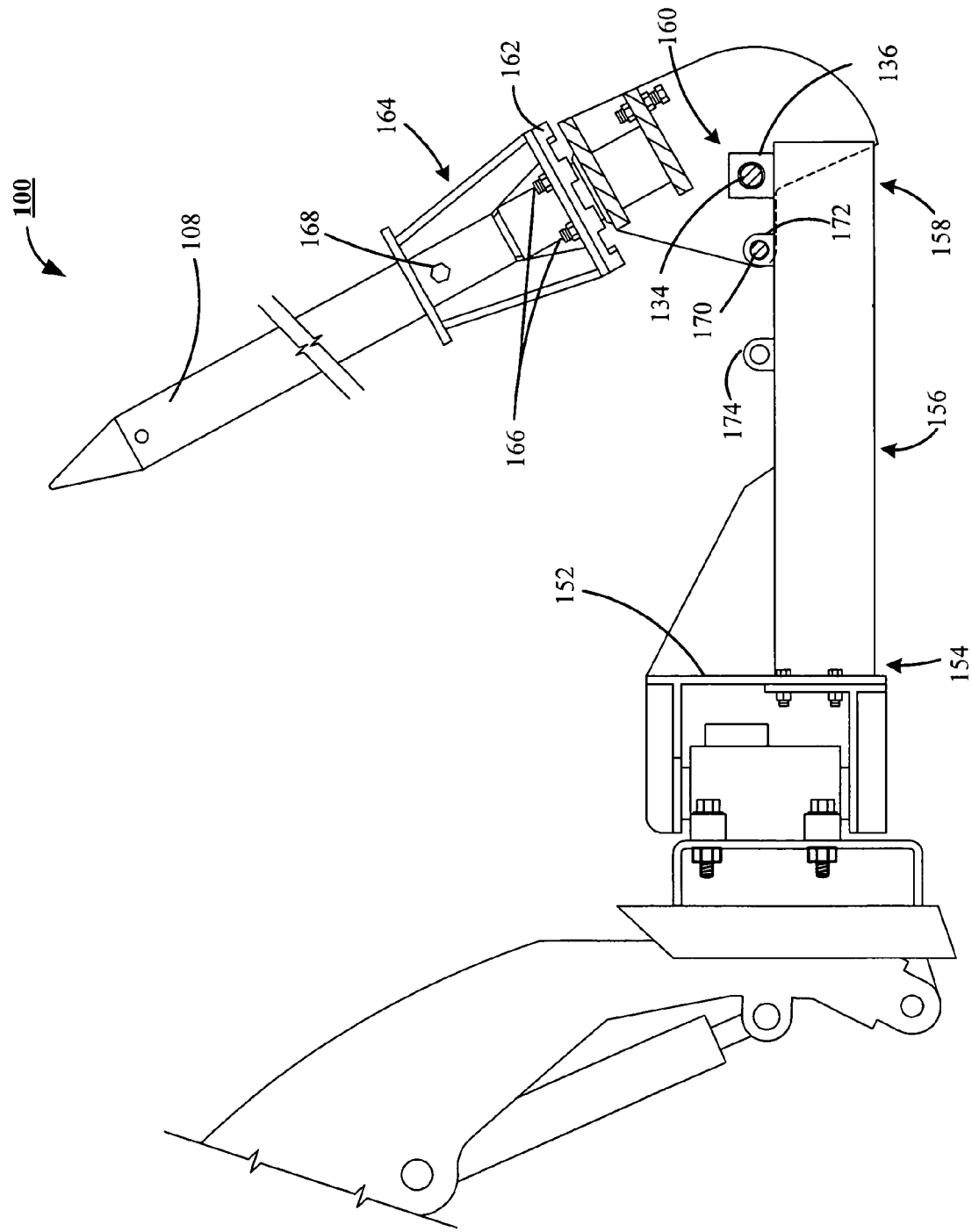
FIG. 5 shows a partial cut-away side elevation view of the inventive erosion control blanket dispensing apparatus of FIG. 1, configured for transport of the apparatus.

Turning to FIG. 5, it will be noted that the spindle support structure 110 includes a securement flange 152 provided at a proximal end 154 of the spindle support structure 110, and a main body portion 156 disposed between the proximal end 154 of the spindle support structure 110 and the rotary hub assembly 114. It is further noted that the rotary hub bushing 136 is mounted on a distal end 158 of the spindle support structure 110, and that the rotary hub axle 134 in combination with the rotary hub bushing 136 forms a bushing assembly 160.

In a preferred embodiment, the rotatable shaft 150 supports an attachment flange 162, which serves as a mounting platform for a spindle collet 164. The spindle collet 164 is preferably attached to the attachment flange 162 by a plurality of fasteners 166. The spindle collet 164 is configured to accept the deposit of the blanket spindle 108 within the confines of its structure. In a preferred embodiment, the blanket spindle 108 is confined within the spindle collet 164 by a spindle confinement member 168. In a preferred embodiment, the spindle confinement member 168 takes the form of a threaded bolt. However, as those skilled in the art will appreciate alternative means of securing the blanket spindle 108 within the spindle collet 164 are available and well-known in the art. Among the alternative means for securing the blanket spindle 108 within the spindle collet 164 are latch pins, bolt and nut combinations, keyways, set screws, and cotter keys to name but a few.

In a preferred embodiment, the blanket spindle 108 has been designed to yield to apply forces prior to those applied forces inflicting damage on other components of the apparatus 100. The utilization of the combination of the spindle collet 164, and the spindle confinement member 168 promotes ease of maintenance of the apparatus 100, if a mishap were to occur. Upon encountering a force that renders the blanket spindle 108 inoperative, the spindle confinement member 168 can be easily removed, the damaged blanket spindle 108 extracted from the spindle collet 164, a replacement blanket spindle 108 placed in the spindle collet 164, and the spindle confinement member 168 reapplied for the securement of the replacement blanket spindle 108 within the spindle collet 164.

During transport of the apparatus 100, a transport pin 170 interacts with the sidewalls 142, 144 of the rotary hub assembly 114, and a first pair of transport stays 172 monitor to the main body portion 156 of the spindle support structure 110. The main body portion 156 of the spindle support structure 110 further provides a second pair of transport stays 174 that collaborate with a safety chain (not separately shown) extending from the spindle collet 164.

Figure 6:
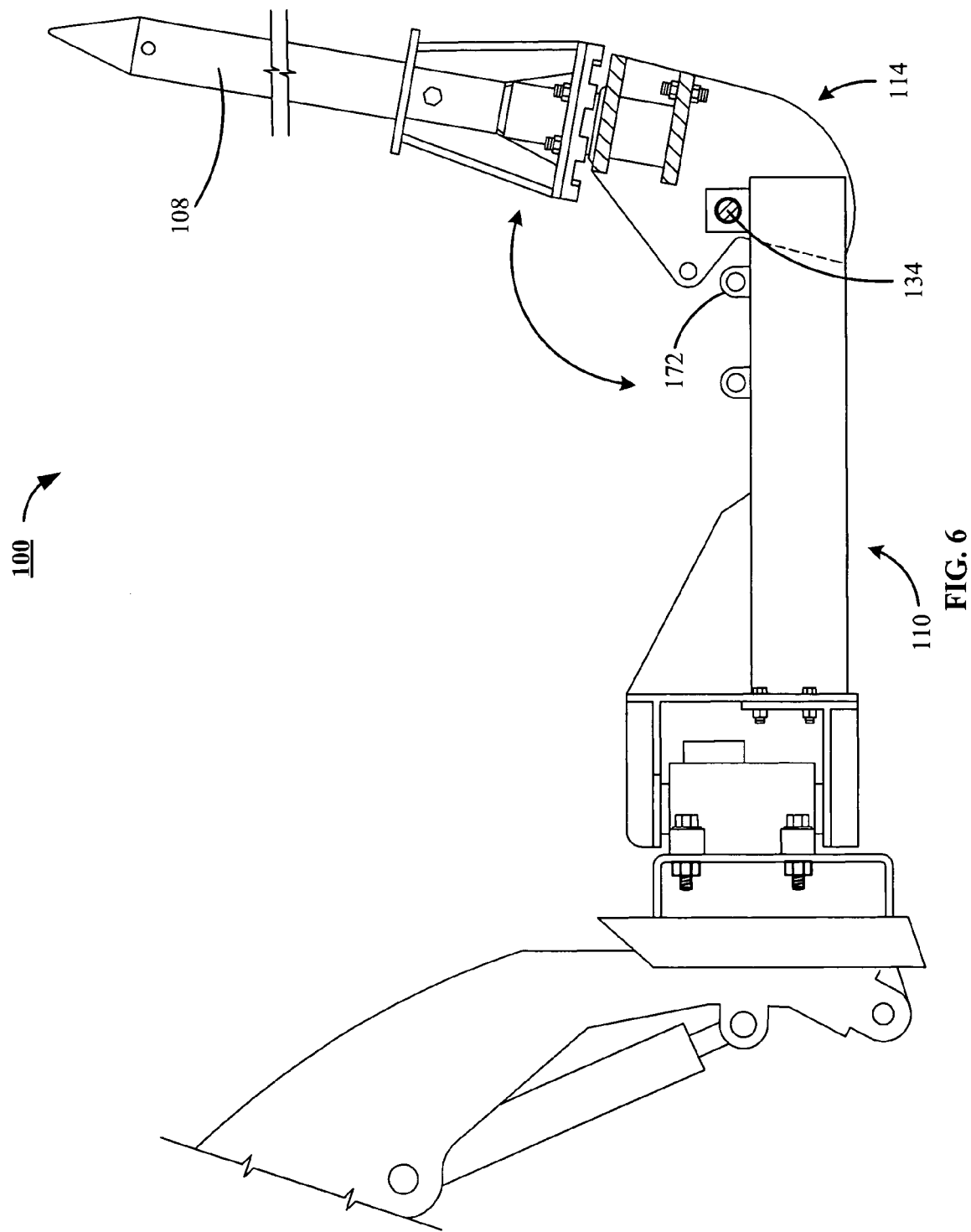
FIG. 6 shows a partial cut-away side elevation view of the inventive erosion control blanket dispensing apparatus of FIG. 1, with the blanket spindle partially lowered in preparation for interaction with the erosion control blanket.

FIG. 6 depicts the apparatus 100 during a transition phase of changing the apparatus 100 from a transport mode to an operative mode. To transition the apparatus 100 from the transport mode to the operative mode, the transport pin 170 (of FIG. 5) is removed from the first pair of transport stays 172, and the rotary hub assembly 114 is rotated about the rotary hub axle 134 to position the blanket spindle 108 in its operative position relative to the spindle support structure 110.

Figure 7:
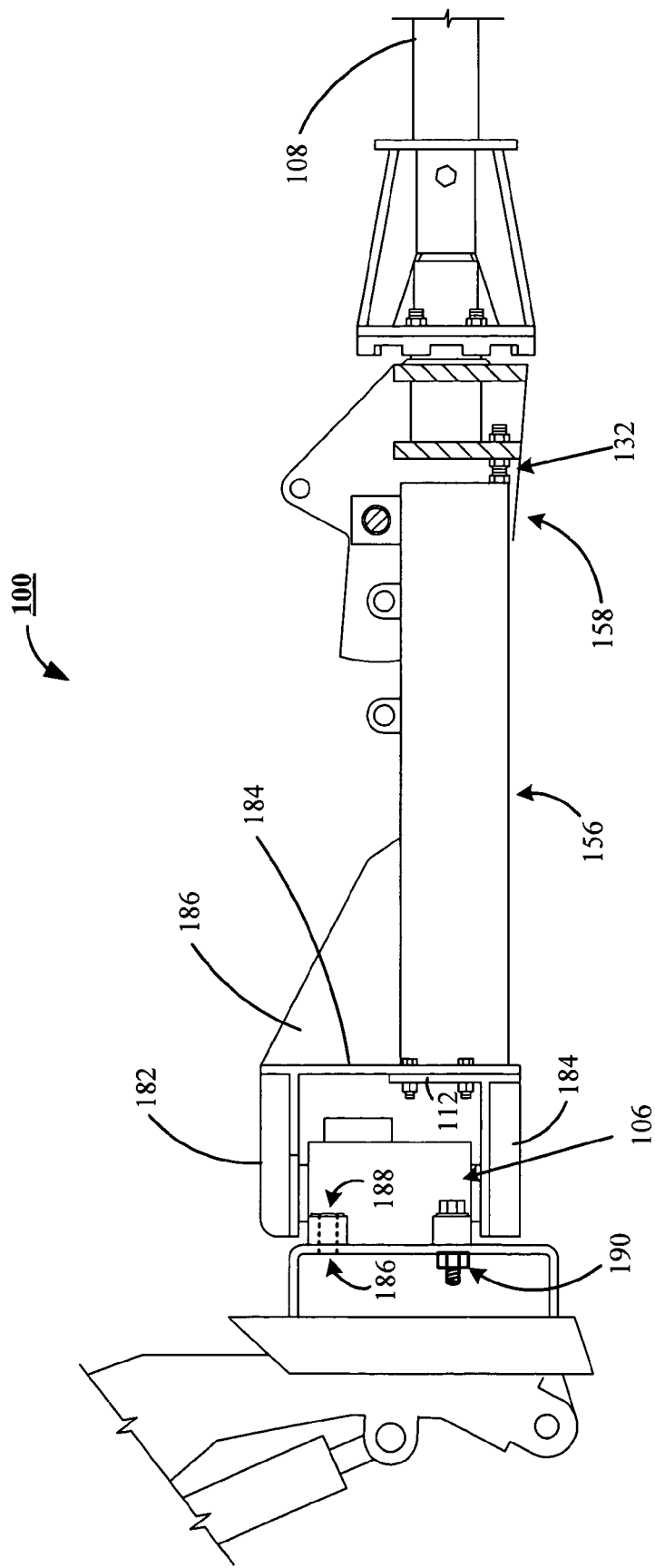
FIG. 7 shows a partial cut-away side elevation view of the inventive erosion control blanket dispensing apparatus of FIG. 1, with the blanket spindle fully lowered in preparation for interaction with the erosion control blanket.

FIG. 7 depicts the apparatus 100 in its initial operative mode. That is, with the blanket spindle 108 extending in the same direction as the spindle support structure 110, and the adjustable stop 132 interacting with the distal end 158 of the spindle support structure 110. FIG. 7 further shows the spindle support structure 110 includes a securement flange 178 secured to the main body portion 156, a gusset 180 attached to the main body portion 156 and securement flange 178, a top flange member 182 mated with the securement flange 178, and a bottom flange member 184 secured to the drive mount 112, mounted to the rotary drive 106, and interacting with the securement flange 178. In a preferred embodiment, to secure the spindle support structure 110 to the mounting plate 102, a mounting aperture 186 is provided by the mounting plate 102, a securement aperture 188 is provided by the attachment plate 116, and a plurality of fasteners 190 are used to join the spindle support structure 110 to the mounting plate 102.

Figure 8:
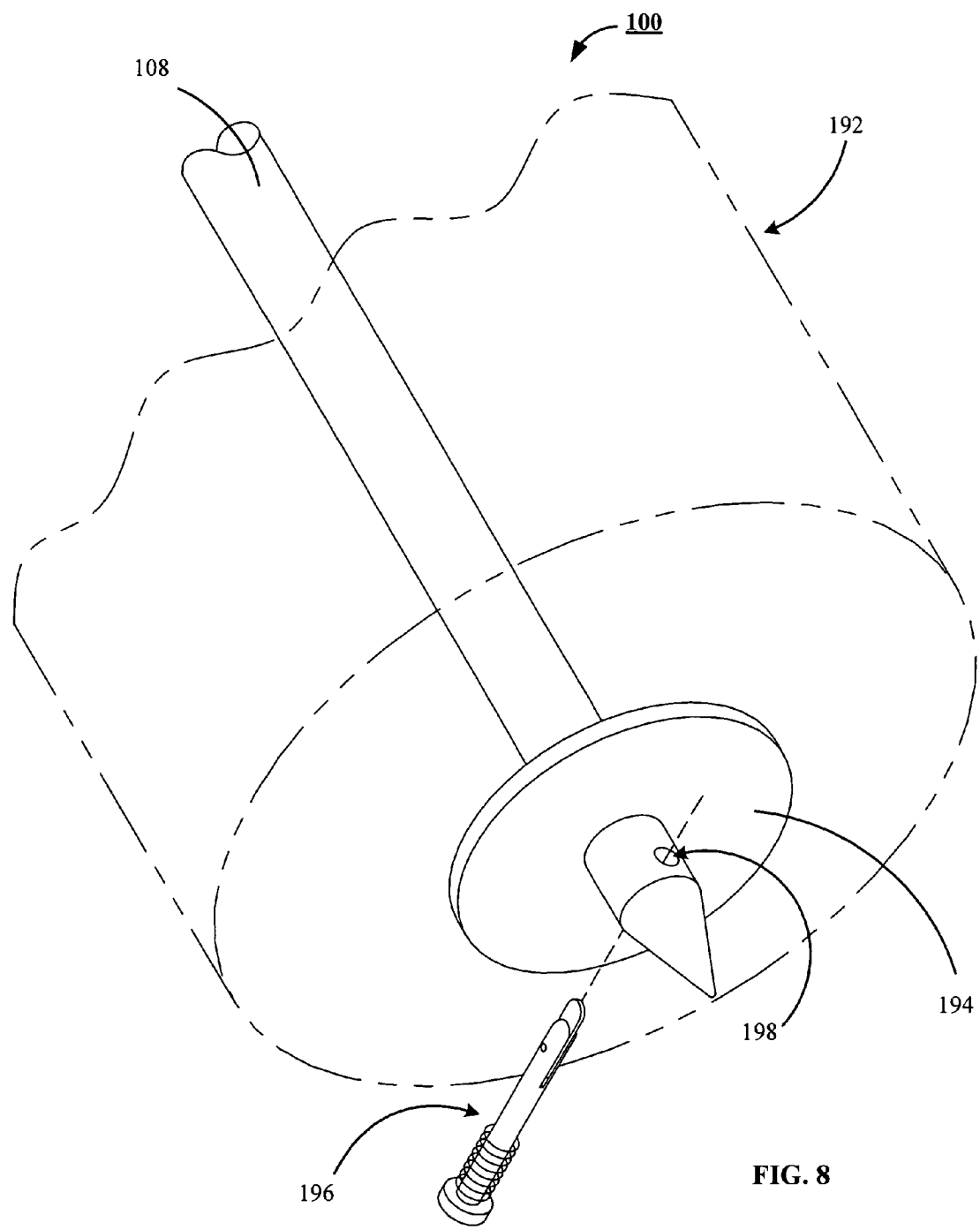
FIG. 8 shows a partial cut-away perspective view of the inventive erosion control blanket dispensing apparatus of FIG. 1, with an erosion blanket mounted to the blanket spindle.

FIG. 8 shows an erosion control blanket 192 (shown in dashed lines), mounted to the blanket spindle 108. In a preferred embodiment, a stop plate 194 is slid over a blanket spindle 108 to mitigate lateral movement of the erosion control blanket 192 loaded on the blanket spindle 108. FIG. 8 further shows a self-locking pin 196 is configured to interact with a locking pin aperture 198 provided by the blanket spindle 108.

Figure 9:
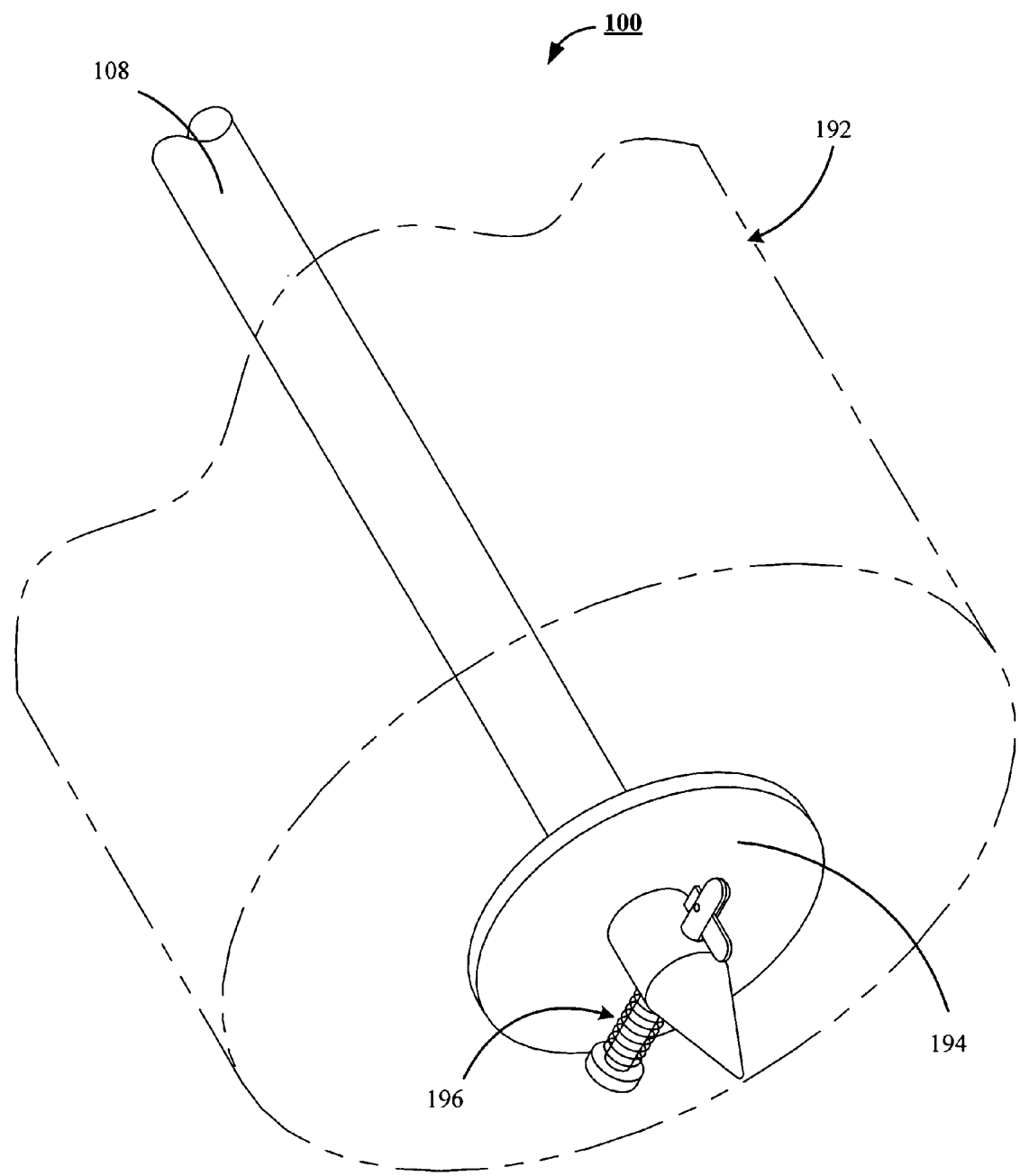
FIG. 9 shows a partial cut-away perspective view of the inventive erosion control blanket dispensing apparatus of FIG. 1, with an erosion blanket mounted to the blanket spindle and secured by a self-locking pin.

FIG. 9 shows the self-locking pin 196 removably secured to the blanket spindle 108 and interacting with the stop plate 194 to maintain the stop plate 194 in abutting adjacency with the erosion control blanket 192. In a preferred embodiment, with the erosion control blanket 192 confined on the blanket spindle 108, the rotary drive 106 (of FIG. 7) is activated to selectively rotate the erosion control blanket 192 to be substantially parallel with a mounting plate 102 (of FIG. 7), thereby positioning the erosion control blanket 192 adjacent the ground for installation of the erosion control blanket 192 upon the ground.

Figure 10:
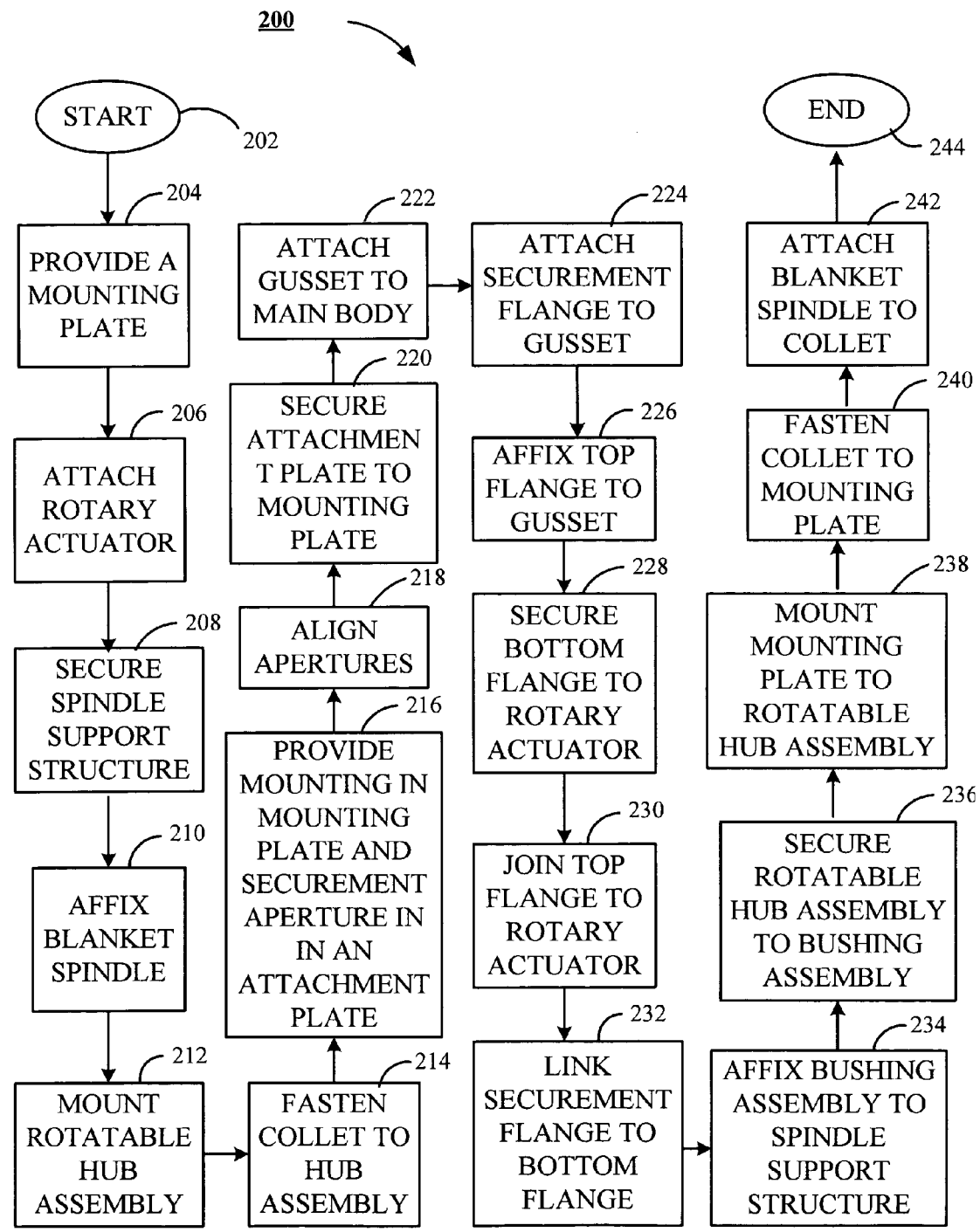
FIG. 10 depicts a flowchart of a method of assembling the inventive erosion control blanket dispensing apparatus of FIG. 1.

Flowchart 200 of FIG. 10 shows method steps of a process of making an erosion control blanket dispensing apparatus (such as 100). The process commences at start process step 202, and continues at process step 204. At process step 204, a mounting plate (such as 102) is provided. At process step 206, a hydraulic rotary actuator (such as 106) is attached to the mounting plate, and at process step 208, a spindle support structure (such as 110) is secured to the hydraulic rotary actuator.

At process step 210, a blanket spindle (such as 108) is affixed to the spindle support structure. At process step 212, a rotary hub assembly (such as 114) is mounted to the spindle support structure. At process step 214, a collet (such as 164) is fastened to the rotary hub assembly, and at process step 216, a mounting aperture (such as 186) is provided in the mounting plate, and a corresponding securement aperture (such as 188) is provided in an attachment plate (such as 116).

The assembly process of the erosion control blanket dispensing apparatus continues at process step 218, with an alignment of the mounting aperture with the securement aperture. At process step 220, the attachment plate is secured to the mounting plate. At process step 222, a gusset (such as 180) is attached to a main body portion (such as 156) of the spindle support structure. At process step 224, a securement flange (such as 178) is attached to the gusset and the main body portion. At process step 226, a top flange (such as 182) is affixed to the gusset and the securement flange.

At process step 228, a bottom flange (such as 184) is secured to a lower end of the hydraulic rotary actuator. At process step 230, the top flange is joined to an upper end of the hydraulic rotary actuator, and at process step 232, the securement flange is linked to the bottom flange. At process step 234, a bushing assembly (such as 160) is affixed to the spindle support structure. At process step 236, the rotary hub assembly is secured to the bushing, and at process step 238, an attachment flange (such as 162) is mounted to the rotary hub assembly. At process step 240, the collet is fastened to the attachment flange. At process step 242, the blanket spindle is attached to the collet for rotation of the blanket spindle, relative to the spindle support structure, and the process concludes at end process step 244.

Figure 11:
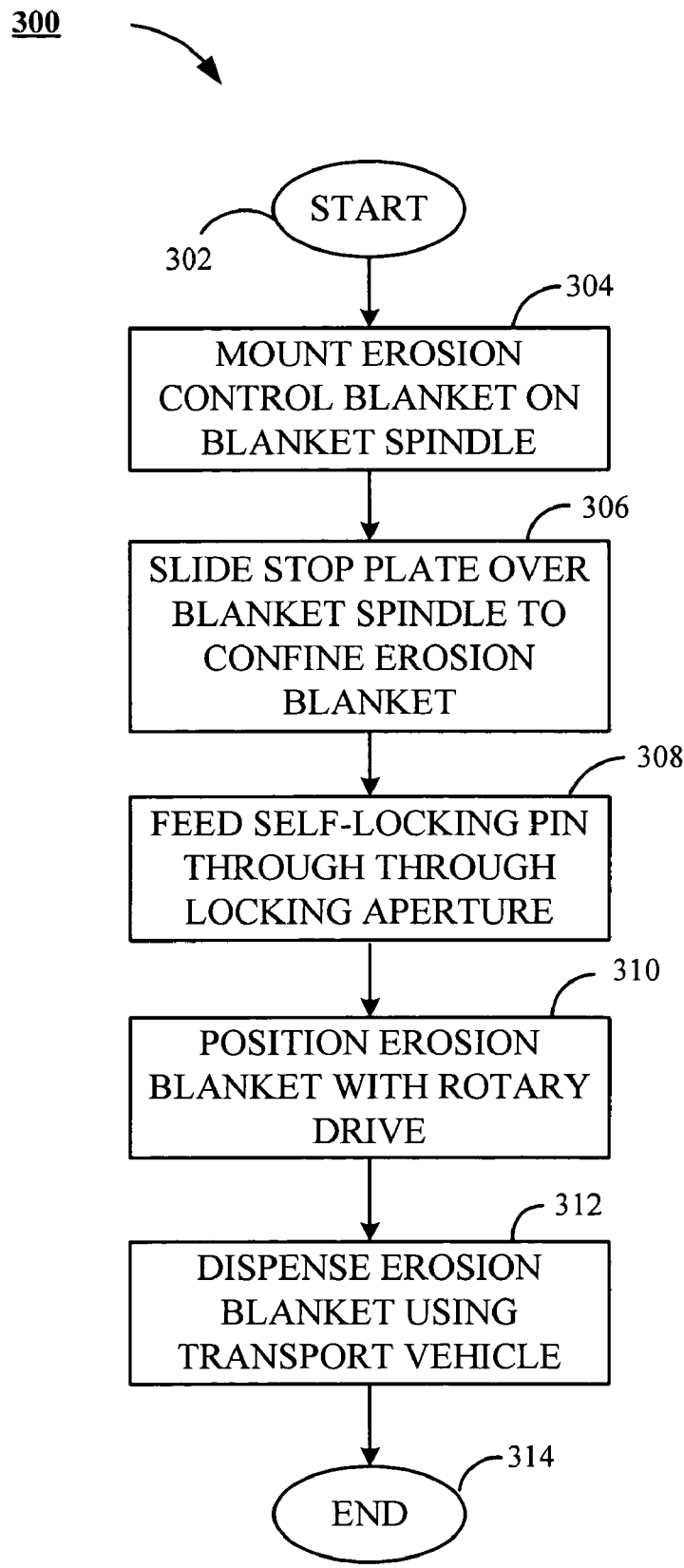
FIG. 11 depicts a flowchart of a method of using the inventive erosion control blanket dispensing apparatus of FIG. 1.

Flowchart 300 of FIG. 11 shows method steps of a process of using an erosion control blanket dispensing apparatus (such as 100). The process commences at start process step 302, and continues at process step 304. At process step 304, an erosion control blanket (such as 192) is mounted on a blanket spindle (such as 108), which extends from a spindle support structure (such as 110). At process step 306, a stop plate (such as 194) is slid over the blanket spindle to confine the erosion control blanket on the blanket spindle, and at process step 308, a self-locking pin (such as 196) is fed through a locking pin aperture (such as 198) provided by the blanket spindle.

With the erosion control blanket securely positioned upon the blanket spindle, the process continues at process step 310. At process step 310, a rotary drive (such as 106) positions the erosion control blanket substantially parallel with a mounting plate (such as 102) of the erosion control blanket dispensing apparatus. At process step 312, a transport vehicle (such as 104), upon which the erosion control blanket dispensing apparatus is mounted, traverses along the ground, and the erosion control blanket is dispensed upon the ground, and the process concludes at end process step 314

While preferred embodiments of the present invention are directed to any erosion control blanket dispensing apparatus, it will be apparent to those skilled in the art, that a number of modifications could be made to the preferred embodiments which would not depart from the spirit or the scope of the present invention. While the presently preferred embodiments have been described for purposes of this disclosure, numerous changes and modifications will be apparent to those skilled in the art. Such changes and modifications are encompassed within the scope and spirit of this invention.

What is claimed is:

1. An erosion control blanket dispensing apparatus comprising:
    a mounting plate;
    a rotary drive secured to the mounting plate; and
    a blanket spindle communicating with and responsive to the rotary drive, wherein the rotary drive controls an angular radial position of the blanket spindle relative to the mounting plate.

2. The erosion control blanket dispensing apparatus of claim 1, further comprising:
    a spindle support structure disposed between and communicating with the rotary drive and the blanket spindle; and
    an adjustable stop disposed between the spindle support structure and the blanket spindle, wherein the adjustable stop controls an angular position of the blanket spindle relative to the spindle support structure.

3. The erosion control blanket dispensing apparatus of claim 2, further comprising a rotary hub assembly disposed between the blanket spindle and the spindle support structure; wherein the adjustable stop is secured to the rotary hub assembly.

4. The erosion control blanket dispensing apparatus of claim 3, further comprising a collet disposed between the rotary hub assembly and the blanket spindle, wherein the collet is attached to the rotary hub assembly, and in which the blanket spindle is removably attached to the collet.

5. The erosion control blanket dispensing apparatus of claim 4, further comprising a stop plate communicating with the blanket spindle, the stop plate mitigating lateral movement of an erosion control blanket loaded on the blanket spindle.

6. The erosion control blanket dispensing apparatus of claim 5, further comprising a self-locking pin removably secured to the blanket spindle and interacting with the stop plate to maintain the stop plate in abutting adjacency with the erosion control blanket.

7. The erosion control blanket dispensing apparatus of claim 6, in which the spindle support structure comprising:
    a securement flange provided at a proximal end of the main body portion and attached to the rotary drive; and
    a bushing assembly attached to a distal end of the main body portion and interacting with the rotary hub assembly to promote angular rotation of the blanket spindle relative to the main body portion.

8. The erosion control blanket dispensing apparatus of claim 7, in which the rotary hub assembly comprising:
    a side wall communicating with the bushing assembly;
    a first horizontal support brace secured to the side wall;
    a casing secured to the first horizontal support brace;
    a bearing mounted within the casing;
    a rotatable shaft communicating with the bearing, the rotatable shaft free to rotate relative to the casing; and an attachment flange secured to the rotatable shaft, wherein the attachment flange is secured to the collet to promote rotation of the blanket spindle relative to the casing.

9. The erosion control blanket dispensing apparatus of claim 1, in which the rotary drive comprising:
an attachment plate secured to the mounting plate; and
an electric motor secured to the attachment plate.

10. The erosion control blanket dispensing apparatus of claim 1, in which the rotary drive comprising:
an attachment plate secured to the mounting plate; and
a pneumatic motor secured to the attachment plate.

11. The erosion control blanket dispensing apparatus of claim 1, in which the rotary drive comprising:
an attachment plate secured to the mounting plate; and
a hydraulic rotary actuator secured to the attachment plate.

12. The erosion control blanket dispensing apparatus of claim 11, further comprising:
a spindle support structure disposed between and communicating with the hydraulic rotary actuator and the erosion blanket spindle;
an adjustable stop disposed between the spindle support structure and the blanket spindle, wherein the adjustable stop controls an angular position of the blanket spindle relative to the spindle support structure;
a rotary hub assembly disposed between the blanket spindle and the spindle support structure, in which the adjustable stop is secured to the rotary hub assembly;
a collet disposed between the rotary hub assembly and the blanket spindle, wherein the collet is attached to the rotary hub assembly and the blanket spindle is removably attached to the collet;
a stop plate communicating with the blanket spindle, the stop plate mitigating lateral movement of an erosion control blanket; and
a self-locking pin removably secured to the blanket spindle and interacting with the stop plate to maintain the stop plate in abutting adjacency with the erosion control blanket.

13. A method of assembling an erosion control blanket dispensing apparatus by steps comprising:
providing a mounting plate;
attaching a hydraulic rotary actuator to the mounting plate;
securing a spindle support structure to the hydraulic rotary actuator;
affixing a blanket spindle to the spindle support structure;
mounting a rotary hub assembly to the spindle support structure; and
fastening a collet to the rotary hub assembly.

14. The method of claim 13, by a step further comprising:
providing a mounting aperture in the mounting plate and a corresponding securement aperture in an attachment plate of the hydraulic rotary actuator.

15. The method of claim 14, in which the step of attaching the hydraulic rotary actuator to the mounting plate comprising:
aligning the mounting aperture with the securement aperture; and
securing the attachment plate to the mounting plate.

16. The method of claim 14, in which the step of securing a spindle support structure to the hydraulic rotary actuator comprising:
attaching a gusset to a main body portion of the spindle support structure;
attaching a securement flange to the gusset and the main body portion;
affixing a top flange to the gusset and the securement flange;
securing a bottom flange to a lower end of the hydraulic rotary actuator;
joining the top flange to an upper end of the hydraulic rotary actuator; and
linking the securement flange to the bottom flange.

17. The method of claim 13, in which the step of affixing the blanket spindle to the spindle support structure comprising:
affixing a bushing assembly to the spindle support structure;
securing a rotary hub assembly to the bushing assembly;
mounting an attachment flange to the rotary hub assembly;
fastening a collet to the attachment flange; and
attaching the blanket spindle to the collet for rotation of the blanket spindle relative to the spindle support structure.

18. A combination comprising:
a mounting plate;
a hydraulic rotary actuator secured to the mounting plate; and
a blanket spindle secured to the hydraulic rotary actuator by steps for assembling an erosion control blanket dispensing apparatus, the steps for assembling an erosion control blanket dispensing apparatus are steps comprising:
providing a mounting plate;
attaching a hydraulic rotary actuator to the mounting plate;
securing a spindle support structure to the hydraulic rotary actuator;
affixing a blanket spindle to the spindle support structure
mounting a rotary hub assembly to the spindle support structure;
fastening a blanket collet to the rotary hub assembly;
providing a mounting aperture in the mounting plate and a corresponding securement aperture in an attachment plate of the hydraulic rotary actuator;
aligning the mounting aperture with the securement aperture; and
securing the attachment plate to the mounting plate.

* * * * *